United States Patent [19]

Ohashi

[11] Patent Number: 5,432,938
[45] Date of Patent: Jul. 11, 1995

[54] METHOD AND SYSTEM FOR CONTROLLING RESUME PROCESS IN COMPUTER UNIT CAPABLE OF CONNECTING EXPANSION UNIT

[75] Inventor: Yasuhiro Ohashi, Tokyo, Japan

[73] Assignee: Kabushiki Kaisha Toshiba, Kawasaki, Japan

[21] Appl. No.: 167,114

[22] Filed: Dec. 16, 1993

Related U.S. Application Data

[63] Continuation of Ser. No. 625,925, Nov. 29, 1990, abandoned.

[30] Foreign Application Priority Data

Nov. 30, 1989 [JP] Japan .................................. 1-311332

[51] Int. Cl.6 .............................................. G06F 11/22
[52] U.S. Cl. ........................... 395/700; 364/DIG. 1; 364/DIG. 2; 364/231; 364/231.1; 364/231.2; 364/269.4
[58] Field of Search ................... 364/DIG. 1 MS File, 364/DIG. 2 MS File; 395/250, 275, 325, 500, 575, 800, 700

[56] References Cited

U.S. PATENT DOCUMENTS

| | | |
|---|---|---|
| 4,377,000 | 3/1983 | Staab ...................................... 371/11 |
| 4,654,818 | 3/1987 | Wetterau, Jr. . |
| 4,747,041 | 5/1988 | Engel et al. . |
| 4,980,836 | 12/1990 | Carter et al. . |
| 4,991,058 | 2/1991 | Watkins et al. . |
| 5,014,193 | 5/1991 | Garner et al. . |
| 5,021,983 | 6/1991 | Nguyen et al. ...................... 364/707 |
| 5,038,320 | 8/1991 | Heath et al. .................. 364/DIG. 2 |
| 5,110,226 | 5/1992 | Sherman et al. . |
| 5,126,910 | 6/1992 | Windsor et al. . |
| 5,133,076 | 7/1992 | Hawkins et al. . |

FOREIGN PATENT DOCUMENTS

| | | |
|---|---|---|
| 0149762 | 7/1985 | European Pat. Off. . |
| 0281999 | 9/1988 | European Pat. Off. . |
| 2223116 | 3/1990 | United Kingdom . |

OTHER PUBLICATIONS

Toshiba Desk Station II, User's Manual, 1990.
Toshiba Desk Station User's Manual, Apr., 1990.

*Primary Examiner*—Robert B. Harrell
*Attorney, Agent, or Firm*—Oblon, Spivak, McClelland, Maier & Neustadt

[57] ABSTRACT

In a computer unit capable of connecting an expansion unit and having a resume function, when a system power source is turned on, it is determined whether or not the resume function is set. If the resume function is set, it is determined whether or not an expansion unit is connected to the computer unit. If no expansion unit is connected to the computer unit, the resume process is executed. When an expansion unit is connected to the computer unit, a warning message is output. A sound signal corresponding to the warning message is generated by a sound generator, and a light signal corresponding to the warning message is generated by an LED (light emitting diode).

36 Claims, 2 Drawing Sheets

METHOD AND SYSTEM FOR CONTROLLING RESUME PROCESS IN COMPUTER UNIT CAPABLE OF CONNECTING EXPANSION UNIT

This application is a Continuation of application Ser. No. 07/625,925, filed on Nov. 29, 1990, now abandoned.

BACKGROUND OF THE INVENTION

1. Field of the Invention

The present invention relates to a method and system for controlling a resume process in a computer unit capable of connecting with an expansion unit.

2. Description of the Related Art

Most of recent personal computers, in particular, battery-driven lap-top computers have a resume function. The resume function is a function of, when a system power source is turned on, instantaneously resuming an operation state of a computer system immediately before the system power source is turned off. Therefore, when the system power source is turned off, data is saved regardless of an operation by an operator, and when the system power source is turned on again, the computer system is started, a program is loaded, and so on.

In order to realize the resume function, in system firmware, when the power source switch is turned off, values of various registers of the computer system are stored in a backup memory, and then, the system power source is turned off. When the system power source is turned on, a process for resuming an operation state of the computer system immediately before the system power source is turned off is executed. Contents stored in the backup memory are backed up by, e.g., a battery. In most of such computers, the resume function can be set/reset by an operator.

A computer system of this type can be connected to an external or internal expansion unit. As expansion units, a memory card, an IC (integrated circuit) card, an HDD (hard disk drive), an FDD (floppy disk drive), a CRT (cathode ray tube) display, and the like are used. Assume that the system power source is turned off after an expansion unit is connected to a computer main body and the resume function is set. In this case, when the system power source is turned on again, the resume function cannot always reliably operate. This is because the expansion unit connected to the computer main body is not recognized in advance in the computer main body, and the system cannot be designed to, e.g., save data in this expansion unit. Assume that after the resume function is set without connecting an expansion unit to the computer main body, and the system power source is turned off, the expansion unit is then connected to the computer main body, and the system power source is turned on. In this case, since the system configuration is changed, data stored in a main memory or a backup memory may be broken, and whether or not the resume function can reliably operate cannot be guaranteed.

Thus, a demand has arisen for a computer which can generate a warning to an operator and can save data before data is broken when the resume function is operated in a state wherein whether or not the resume process can reliably operate is not guaranteed.

SUMMARY OF THE INVENTION

It is an object of the present invention to provide a method and a system for controlling a resume process in a computer unit capable of connecting an expansion unit.

According to one aspect of the present invention, there is provided a method for controlling a resume process in a computer unit capable of connecting an expansion unit, the method comprising the steps of: determining whether or not a resume function for the resume process is set; determining whether or not the expansion unit is connected to the computer unit; and outputting a warning signal representing a warning message in accordance with determination results.

According to another aspect of the present invention, there is provided a system for controlling a resume process in a computer unit capable of connecting an expansion unit, the system comprising: means for determining whether or not a resume function for the resume process is set, and determining whether or not the expansion unit is connected to the computer unit; and means for outputting a warning signal representing a warning message in accordance with determination results.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be described below with reference to the accompanying drawings.

Figure 1:
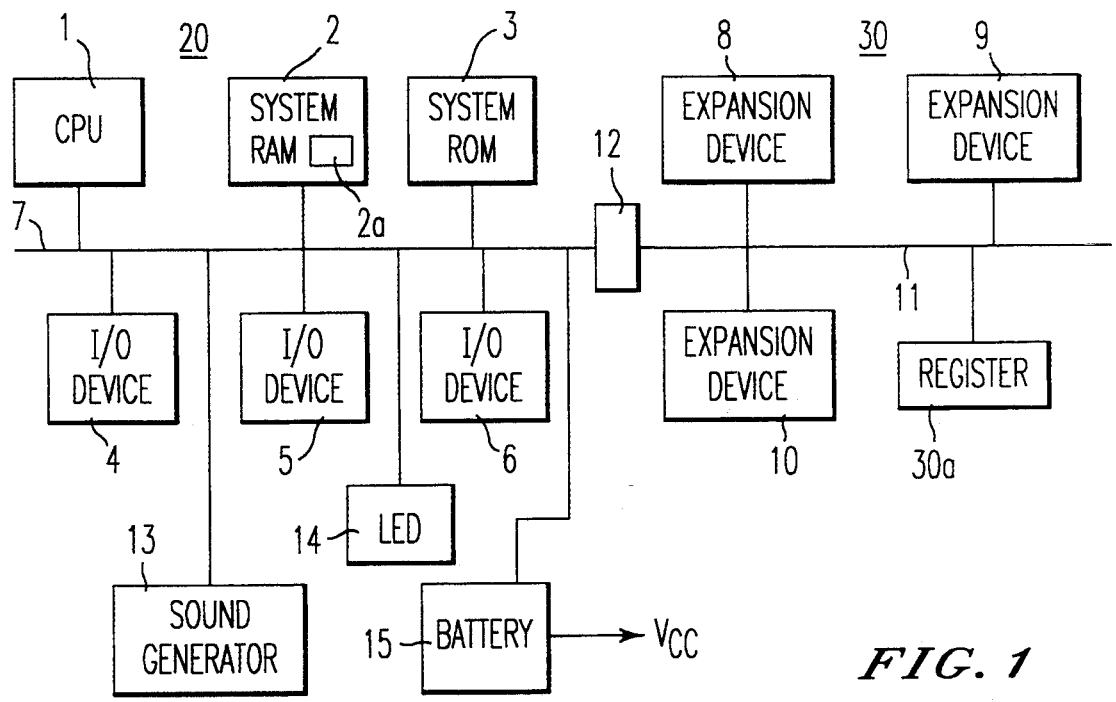
FIG. 1 is a block diagram showing an arrangement of a system according to an embodiment of the present invention.

In FIG. 1, a system of this embodiment comprises a main unit 20 and an expansion unit 30.

The main unit 20 comprises a CPU (central processing unit) 1, a system RAM (random access memory) 2, a system ROM (read only memory) 3, input/output (I/O) devices 4, 5, and 6, a main bus 7, an interface 12, a battery 15, a sound generator 13, and an LED (light emitting diode) 14. The expansion unit 30 comprises expansion devices 8, 9, and 10, and an expansion bus 11.

The CPU 1 controls the overall system.

The system RAM 2 stores an OS (operating system), an application program, and the like.

The system ROM 3 stores a BIOS (basic input and output system).

The I/O devices 4, 5, and 6 respectively comprise a keyboard, a printer, and a display.

The main bus 7 comprises an address bus, a data bus, and a control bus, and is commonly connected to the CPU 1, the system RAM 2, the system ROM 3, the I/O devices 4, 5, and 6, the interface 12, the sound generator 13, and the LED 14.

When a warning message is output, the sound generator 13 generates a sound signal corresponding to the warning message, and the LED 14 generates a light signal corresponding to the warning message by an LED controller (not shown), as will be described later.

The expansion devices 8, 9, and 10 are external I/O devices, and are commonly connected by the expansion bus 11 including an address bus, a data bus, and a control bus.

The interface 12 is used to perform data transmission/reception between the main unit 20 and the expansion unit 30. The battery 15 supplies an operating voltage Vcc to the elements of the main unit 20 in response to the controlling of the CPU 1.

Figure 2:
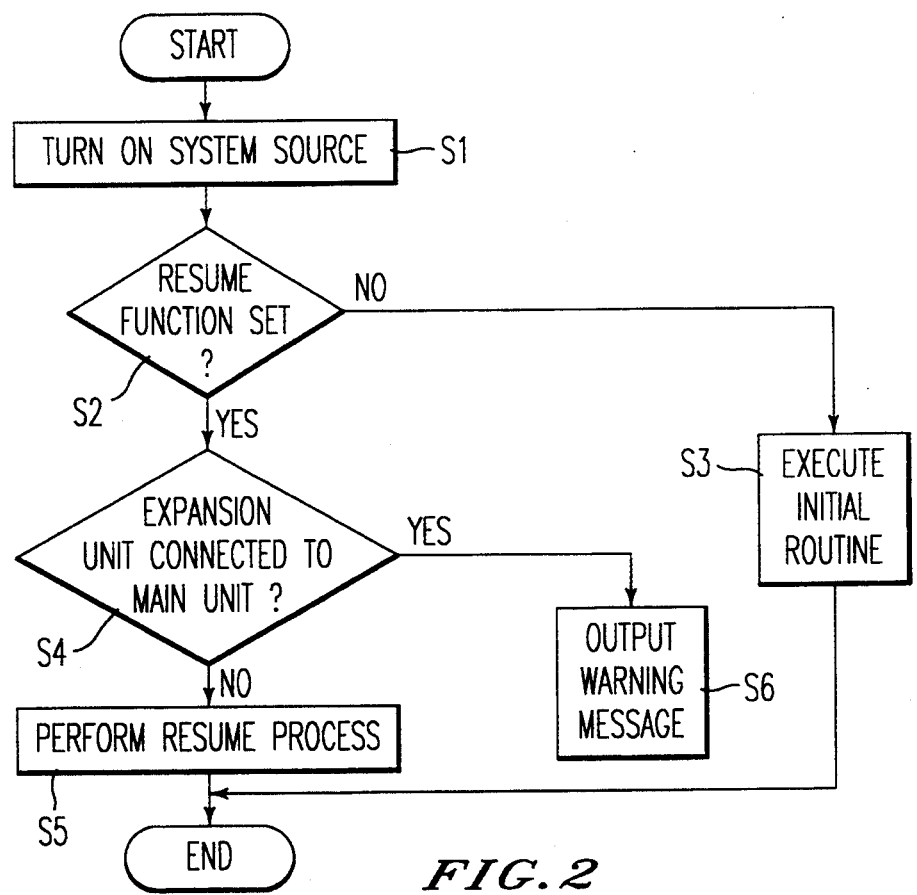
FIG. 2 is a flow chart showing resume process control in the system of this embodiment.

The resume process control in the system of this embodiment will be described below with reference to the flow chart shown in FIG. 2.

In step S1, a system power source (not shown) is turned on. It is determined in step S2 whether or not a resume function is set. Set/reset of the resume function is determined by checking a set/reset state of a resume flag 2a.

If it is determined in step S2 that the resume flag 2a is reset, i.e., that the resume function is not set, an initial routine for normally starting a system without executing the resume process is executed (step S3).

If it is determined in step S2 that the resume flag 2a is set, i.e., that the resume function is set, it is determined in step S4 whether or not the expansion unit 30 is connected to the main unit 20. In this case, information representing the expansion unit 30 is stored in a register 30a allocated in advance in the expansion unit 30, and the information stored in this register 30a is read out to perform the above-mentioned determining operation. If a plurality of expansion units are connected to the main unit 20, inherent information is stored in a register of each expansion unit, and the corresponding information is read out, thereby to determine whether or not the expansion unit is connected to the main unit.

If it is determined in step S4 that no expansion unit 30 is connected, the resume process is executed (step S5), thus resuming an operation state of a system immediately before the system power source is turned off.

If it is determined in step S4 that the expansion unit 30 is connected to the main unit 20, a warning message is output (step S6), and a sound signal corresponding to the warning message is generated by the sound generator 13. Warning information corresponding to the warning message is displayed on, e.g., the I/O device 6 used as a display. Furthermore, a light signal corresponding to the warning message is generated by the LED 14 in control of the LED controller.

Note that a warning process for outputting the warning message must not influence the resume process. When the storage contents of the memory are changed by this warning process, data to be saved in the resume process may be lost.

When the warning message is output, the system power source is temporarily turned off by the operator. After the expansion unit 30 is disconnected from the main unit 20, the system power source is turned on again. Thus, the resume process can be normally performed, and an operation state of the system immediately before the system power source is turned off can be resumed.

Figure 3:
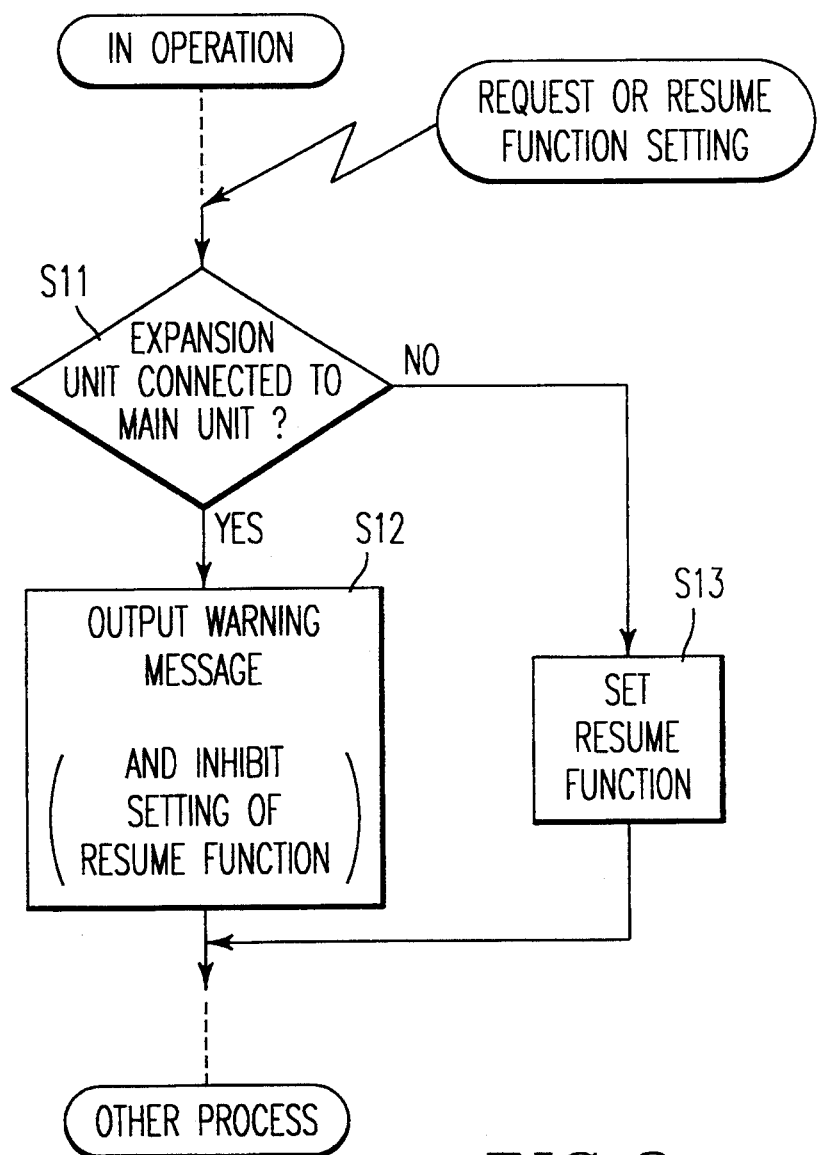
FIG. 3 is a flow chart showing a process which senses the presence or absence of an expansion unit.

After data is saved at this time, when the resume function is reset and the system power source is turned off, the expansion unit 30 can be connected regardless of data destruction. The controlling of the resume function setting during an operation of this embodiment will be described below with reference to the flowchart shown in FIG. 3.

When the resume function is to be set by the operator (if setting of the resume function is requested) during an operation of the system, it is determined whether or not the expansion unit 30 is connected to the main unit 20 (step S11). When the expansion unit 30 is connected, the warning message is output, as described above (step S12). In this case, setting of the resume function by the operator can be inhibited. When the expansion unit 30 is disconnected, the resume function is set (step S13).

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer implemented method for controlling a resume process in a computer unit for connecting with an expansion unit having a register for storing information identifying the expansion unit and one or more expansion devices, the method comprising the steps of:

determining whether a resume function for the resume process is set in the computer unit;

determining, after the step of determining whether a resume function for the resume process is set in the computer unit determines that the resume function is set, if the expansion unit is connected to the computer unit by attempting to read the register, the expansion unit is determined to be connected to the computer unit when the attempt to read the register succeeds and the expansion unit is determined to be unconnected with the computer unit when the attempt to read the register fails; and then outputting when power is returned, a warning signal representing a warning message when the resume function is determined to be set and the expansion unit is determined to be connected to the computer unit by the step for determining if the expansion unit is connected to the computer unit, independent of the computer unit being connected to the expansion unit when the computer unit was powered off at a prior time.

2. The method according to claim 1, wherein the outputting step includes at least one of a step of outputting a sound signal for driving a sound generator, a step of outputting a light signal for driving a light emitting diode and a step of outputting warning data for displaying the warning message.

3. A method according to claim 1 wherein the computer unit is a battery powered portable computer unit and wherein:

the step of determining if the resume function is set determines if the resume function is set in the battery powered portable computer unit;

the step of determining if the expansion unit is connected to the computer unit determines if the expansion unit is connected to the battery powered portable computer; and the step of outputting a warning signal is performed when the resume function is determined to be set, the expansion unit is determined to be connected to the battery powered portable computer unit, and before the resume process is finished executing.

4. A method according to claim 1, wherein the outputting step outputs the warning signal before the resume process is finished executing.

5. A system for controlling a resume process in a computer for connecting with an expansion unit having a register for storing information identifying the expansion unit and one or more expansion devices, the system comprising:
- first determining means for determining if a resume function for the resume process is set;
- second determining means for determining, after the resume function is determined to be set by the first determining means, if the expansion unit is connected to the computer unit by attempting to read said information in the register, the expansion unit is determined to be connected to the computer unit when the attempt to read said information in the register succeeds and the expansion unit is determined to be unconnected with the computer unit when the attempt to read said information in the register fails; and
- means for outputting, when power is returned, a warning signal representing a warning message when the resume function is determined to be set by the first determining means and the expansion unit is determined to be connected to the computer unit by the second determining means, independent of the computer unit being connected to the expansion unit when the computer unit was powered off at a prior time.

6. The system according to claim 4, wherein the warning signal includes at least one of a sound signal, a light signal and an image signal.

7. The system according to claim 4, wherein the outputting means includes at least one of a sound generator, a light generator, and a display device.

8. A system according to claim 5, wherein the computer unit is a battery powered portable computer unit.

9. A system according to claim 5, wherein the outputting means outputs the warning signal before the resume process is finished executing.

10. A system for controlling a resume process in a portable computer removably connected to an expansion unit having one or more expansion devices, comprising:
- a memory storing data identifying the expansion unit;
- an attempt means for attempting to read the memory when the portable computer is powered up;
- first detecting means for detecting if a resume function for the resume process is set in the portable computer when the portable computer is powered up;
- second detecting means for detecting if the expansion unit is connected to the portable computer when the portable computer is powered up, the second detecting means detecting a connection of the expansion unit to the portable computer when the attempt means succeeds in attempting to read the memory,
- outputting means for outputting, when power is returned, a warning signal representing a warning message when the first detecting means detects the resume function is set in the portable computer and the second detecting means detects that the expansion unit is connected to the portable computer, independent of the portable computer being connected to the expansion unit when the portable computer was powered off at a prior time.

11. A system according to claim 10, wherein the outputting means outputs the warning signal before the resume process is finished executing.

12. A system for controlling a resume process in a portable computer removably connected to an expansion unit having one or more expansion devices, comprising:
- a memory storing data identifying the expansion unit;
- an attempt means for attempting to read the memory when the portable computer is powered up;
- first detecting means for detecting if a resume function for the resume process is set in the portable computer when the portable computer is powered up;
- second detecting means for detecting if the expansion unit is connected to the portable computer when the portable computer is powered up, the second detecting means detecting a connection of the expansion unit to the portable computer when the attempt means succeeds in attempting to read the memory,
- first outputting means for outputting, when power is returned, warning data representing a warning message when the first detecting means detects that the resume function is set in the portable computer and the second detecting means detects that the expansion unit is connected to the portable computer, independent of the portable computer being connected to the expansion unit when the portable computer was powered off at a prior time; and
- second outputting means for outputting a warning message in response to the warning data.

13. A computer system according to claim 12, wherein the second outputting means includes a light emitting diode.

14. A computer system according to claim 12, wherein the second output means includes an input/output device having a display.

15. A computer system according to claim 12, wherein the second output means includes a sound generator.

16. A system according to claim 12, wherein the first outputting means outputs the warning data before the resume process is finished executing.

17. A system for controlling a resume process, comprising:
- an expansion unit having a first memory for storing first data for identifying the expansion unit having one or more expansion devices; and
- a portable computer, removably connected to the expansion unit, for executing the resume process, including:
  - a second memory for storing second data for indicating an execution of the resume process;
  - first detecting means for detecting if the second data is stored in the second memory when the portable computer is powered up;
  - second detecting means for detecting if the expansion unit is connected to the portable computer by attempting to read the first data when the portable computer is powered up, the second detecting means detecting a connection of the portable computer to the expansion unit when the attempt to read the first data succeeds;
  - first outputting means for outputting, when power is returned, a warning signal when the first detecting means detects that the second data is set in the second memory and the second detecting means detects that the expansion unit is connected to the portable computer independent of the portable computer being connected to the expansion unit when the portable computer was powered off at a prior time; and second outputting means for outputting a warning message in response to the warning signal.

18. A system according to claim 17, wherein the first outputting means outputs the warning signal before the resume process is finished executing.

19. A computer implemented method for starting a computer, comprising the computer implemented steps of:

determining if a resume function is set in the computer;

determining if the computer is connected to an expansion unit which cannot be reliably started using the resume function;

outputting a warning message indicating that the computer is connected to an expansion unit, whenever the computer is determined to be connected to an expansion unit and the resume function is set in the computer;

performing a resume process to start the computer, after the warning message is outputted, when the resume function is determined to be set in the computer; and performing an initializing routine, when the step for determining if the resume function is set does not determine that the resume function is set.

20. A method according to claim 19, further comprising the step of, performed after the warning message is outputted and before the resume process is performed:

inputting a command which inhibits the resume process from being performed.

21. An apparatus for starting a computer, comprising:

means for determining if a resume function is set in the computer;

means for determining if the computer is connected to an expansion unit which cannot be reliably started using the resume function;

means for outputting a warning message indicating that the computer is connected to an expansion unit, whenever the computer is determined to be connected to an expansion unit and the resume function is determined to be set in the computer;

means for performing a resume process to start the computer after the means for outputting outputs the warning message, when the resume function is determined to be set in the computer; and means for performing an initializing routine, when the means for determining if the resume function is set does not determine that the resume function is set.

22. A method according to claim 21, further comprising:

means for inputting a command which inhibits the resume process from being performed, after the warning message is outputted and before the resume process is completed.

23. A computer implemented method for controlling setting of a resume function in a computer unit for connecting with an expansion unit having a register for storing information identifying the expansion unit and one or more expansion devices, the method comprising the steps of:

determining, in response to a request of the setting of the resume function during an operation of the computer unit, if the expansion unit is connected to the computer unit by attempting to read the register, the expansion unit is determined to be connected to the computer unit when the attempt to read the register succeeds and the expansion unit is determined to be unconnected with the computer unit when the attempt to read the register fails; and outputting a warning signal representing a warning message when the expansion unit is determined to be connected to the computer unit by the step for determining if the expansion unit is connected to the computer unit.

24. A method according to claim 23, further comprising the step of:

inhibiting setting of the resume function when the expansion unit is determined to be connected to the computer unit by the step for determining if the expansion unit is connected to the computer unit.

25. A method according to claim 23, wherein the outputting step includes at least one of the steps of outputting a sound signal for driving a sound generator, of outputting a light signal for driving a light emitting diode and of outputting warning data for displaying the warning message.

26. A system for controlling setting of a resume function in a portable computer removably connected to an expansion unit having one or more expansion devices, comprising:

a memory storing data identifying the expansion unit;

attempt means for attempting to read the memory when the portable computer is powered up;

detecting means, in response to a request of the setting of the resume function during an operation of the portable computer, for detecting if the expansion unit is connected to the portable computer, the detecting means detecting a connection of the expansion unit to the portable computer when the attempt means succeeds in attempting to read the memory; and outputting means for outputting a warning signal representing a warning message when the detecting means detects that the expansion unit is connected to the portable computer.

27. A system according to claim 26, further comprising:

inhibiting means for inhibiting setting of the resume function when the detecting means detects a connection of the expansion unit to the portable computer.

28. A system according to claim 26, wherein the outputting means includes a light emitting diode.

29. A system according to claim 26, wherein the outputting means includes an input/output device having a display.

30. A system according to claim 26, wherein the outputting means includes a sound generator.

31. A system for controlling setting of a resume function in a portable computer, comprising:

an expansion unit having a first memory for storing identification data for identifying the expansion unit, and having one or more expansion devices; and a portable computer, removably connected to the expansion unit, for executing a resume process, including:

detecting means, in response to a request of the setting of the resume function during an operation of the portable computer, for detecting if the expansion unit is connected to the portable computer by attempting to read the identification data, the detecting means detecting a connection of the portable computer to the expansion unit when the attempt to read the identification data succeeds;

first outputting means for outputting a warning signal when the detecting means detects that the expansion unit is connected to the portable computer; and second outputting means for outputting a warning message in response to the warning signal.

32. A system according to claim 31, wherein the second outputting means includes a light emitting diode.

33. A system according to claim 31, wherein the second outputting means includes an input/output device having a display.

34. A system according to claim 31, wherein the second outputting means includes a sound generator.

35. A system for controlling a resume process in a computer for connecting with an expansion unit having a register for storing information identifying the expansion unit and one or more expansion devices, the system comprising:

a CPU programmed to performed the steps of:

determining if a resume function for the resume process is set;

determining, after the resume function is determined to be set by the first determining means and before the resume process is finished executing, if the expansion unit is connected to the computer unit by attempting to read said information in the register, the expansion unit is determined to be connected to the computer unit when the attempt to read said information in the register succeeds and the expansion unit is determined to be unconnected with the computer unit when the attempt to read said information in the register fails; and outputting a warning signal, when power is returned, representing a warning message when the resume function is determined to be set by the first determining step and the expansion unit is determined to be connected to the computer unit by the second determining means, independent of the computer unit being connected to the expansion unit when the computer unit was powered off at a prior time.

36. A system according to claim 35, further comprising:

output means for outputting a message to a user in response to the outputting of the warning signal by the CPU.

* * * * *